US012724227B2

(12) United States Patent
Bachar et al.

(10) Patent No.: US 12,724,227 B2
(45) Date of Patent: Sep. 1, 2026

(54) LINEAR BALL GUIDED VOICE COIL MOTOR FOR FOLDED OPTIC

(71) Applicant: Corephotonics Ltd., Tel Aviv (IL)

(72) Inventors: Gil Bachar, Tel Aviv (IL); Itay Yedid, Tel Aviv (IL); Gal Shabtay, Tel Aviv (IL); Ephraim Goldenberg, Tel Aviv (IL); Gal Avivi, Tel Aviv (IL); Itay Jerby, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 19/442,286

(22) Filed: Jan. 7, 2026

(65) Prior Publication Data

US 2026/0126612 A1 May 7, 2026

Related U.S. Application Data

(63) Continuation of application No. 19/185,276, filed on Apr. 22, 2025, now Pat. No. 12,541,077, which is a continuation of application No. 18/888,195, filed on Sep. 18, 2024, now Pat. No. 12,298,590, which is a continuation of application No. 18/626,499, filed on Apr. 4, 2024, now Pat. No. 12,124,106, which is a continuation of application No. 18/077,367, filed on Dec. 8, 2022, now Pat. No. 11,977,270, which is a continuation of application No. 17/224,494, filed on Apr. 7, 2021, now Pat. No. 11,550,119, which is a continuation of application No. 16/863,239, filed on Apr. 30, 2020, now Pat. No. 11,048,060, which is a continuation of application No. 15/738,951, filed as application No. PCT/IB2017/054088 on Jul. 6, 2017, now Pat. No. 10,845,565.

(60) Provisional application No. 62/359,222, filed on Jul. 7, 2016.

(51) Int. Cl.
*G02B 7/09* (2021.01)
*G02B 27/64* (2006.01)
*H04N 23/54* (2023.01)
*H04N 23/55* (2023.01)

(52) U.S. Cl.
CPC ............ *G02B 7/09* (2013.01); *G02B 27/646* (2013.01); *H04N 23/54* (2023.01); *H04N 23/55* (2023.01)

(58) Field of Classification Search
CPC ...... G02B 7/09; G02B 27/646; H04N 5/2253; H04N 5/2254
See application file for complete search history.

(56) References Cited

U.S. PATENT DOCUMENTS 9,426,450 B1 * 8/2016 Zhang .................... G03B 13/32
2015/0346587 A1 * 12/2015 Lim ....................... G03B 17/02 348/373
2016/0219222 A1 * 7/2016 Heo ....................... H04N 23/55
2016/0353008 A1 * 12/2016 Osborne ................ G03B 13/36
2017/0235094 A1 * 8/2017 Osaka ................ H02K 41/0356 359/824

(Continued)

*Primary Examiner* — Zoheb S Imtiaz

(74) *Attorney, Agent, or Firm* — Nathan & Associates Patent Agents Ltd.; Menachem Nathan

(57) ABSTRACT

Actuators for carrying and actuating a lens having a first optical axis, the lens receiving light folded from a second optical axis substantially perpendicular to the first optical axis, comprising first and second VCM engines coupled to the lens and first and second linear ball-guided rails operative to create movement of the lens in two substantially orthogonal directions upon actuation by respective VCM engines.

20 Claims, 11 Drawing Sheets

(56) References Cited

U.S. PATENT DOCUMENTS

2019/0141248 A1 * 5/2019 Hubert ............... H02K 41/0356

* cited by examiner

LINEAR BALL GUIDED VOICE COIL MOTOR FOR FOLDED OPTIC

CROSS REFERENCE TO RELATED APPLICATIONS

This application is a continuation from U.S. patent application Ser. No. 19/185,276 filed Apr. 22, 2025 (now allowed), which was a continuation from U.S. patent application Ser. No. 18/888,195 filed Sep. 18, 2024 (issued as U.S. Pat. No. 12,298,590), which was a continuation from U.S. patent application Ser. No. 18/626,499 filed Apr. 4, 2024 (issued as U.S. Pat. No. 12,124,106), which was a continuation from U.S. patent application Ser. No. 18/077,367 filed Dec. 8, 2022 (issued as U.S. Pat. No. 11,977,720), which was a continuation from U.S. patent application Ser. No. 17/224,494 filed Apr. 7, 2021 (issued as U.S. Pat. No. 11,550,119), which was a continuation from U.S. patent application Ser. No. 16/863,239 filed Apr. 30, 2020 (issued as U.S. Pat. No. 11,048,060), which was a continuation from U.S. patent application Ser. No. 15/738,951 filed Dec. 21, 2017 (issued as U.S. Pat. No. 10,845,565), which was a 371 application from international patent application PCT/IB2017/054088 filed Jul. 6, 2017, and is related to and claims priority from U.S. Provisional Patent Application No. 62/359,222, filed Jul. 7, 2016, which is incorporated herein by reference in its entirety.

FIELD

Embodiments disclosed herein relate in general to actuating mechanisms ("actuators") and in particular to voice coil motor (VCM) actuators for digital cameras.

BACKGROUND

High-end digital camera modules, and specifically cellphone (e.g. smartphone) digital cameras include mechanisms that enable advanced optical function such as focus or optical image stabilization (OIS). Such mechanisms may actuate (e.g. displace, shift or tilt) an optical element (e.g. lens, image sensor, mirror) to create the desired optical function. A commonly used actuator is based on voice coil motor (VCM) technology. In VCM technology, a permanent (or "fixed") magnet and a coil are used to create actuation force. The coil is positioned in the vicinity of the magnetic field of the fixed magnet. Upon driving current in the coil, a Lorentz force is created on the coil, an in return an equal counter-force is applied on the magnet. The magnet or the coil is rigidly attached to an optical element to construct an actuated assembly. The actuated assembly is then moved by the magnetic Lorenz force. Henceforth, in this description, a VCM will be referred to also as "VCM engine" and an actuator including such a VCM (or VCM engine) will be referred to as to as "VCM actuator" or simply "actuator".

In addition to the magnetic force, a mechanical rail is known to set the course of motion for the optical element. The mechanical rail keeps the motion of the lens in a desired path, as required by optical needs. A typical mechanical rail is known in the art as "spring-guided rail", in which a spring or set of springs is used to set the motion direction. A VCM that includes a spring-guided rail is referred to as a "spring-guided VCM". For example, US patent application No. 20110235196 discloses a lens element shifted in a linear spring rail to create focus. For example, international patent application PCT/IB2016/052179 discloses the incorporation and use of a spring guided VCM in a folded camera structure ("FCS"—also referred to simply as "folded camera"). The disclosure teaches a lens element shifted to create focus and OIS and an optical path folding element (OPFE) shifted in a rotational manner to create OIS. Also, PCT/IB2016/052179 teaches AF+OIS in a folded actuator where the actuator dos not add to the module height.

Another typical mechanical rail is known in the art a "ball-guided rail", see e.g. U.S. Pat. No. 8,810,714. With a ball-guided rail, the lens is bound to move in the desired direction by set of balls confined in a groove (also referred to as "slit"). A VCM that includes a ball-guided rail is referred to as a "ball-guided VCM". A ball-guided VCM has several advantages over a spring-guided VCM. These include: (1) lower power consumption, because in a spring-guided VCM the magnetic force has to oppose a spring mechanical force, which does not exist in a ball-guided VCM, and (2) higher reliability in drops that may occur during the life-cycle of a camera that includes the VCM. The actuation method in U.S. Pat. No. 8,810,714 is designed for a standard non-folded lens, where the lens optical axis is directly pointed at the object to be photographed and cannot be used in a folded camera.

In view of the above, there is a need for, and it would be advantageous to have a linear ball guided VCM inside a folded camera to reduce the folded camera dimensions, in particular camera height and/or width. In addition, there is a need to show such a structure in a combination with various actuation mechanisms for the OPFEs in these cameras.

SUMMARY

Aspects of embodiments disclosed herein relate to VCMs to actuators including such VCMs, the actuators having linear ball-guided rails for AF and OIS in a folded camera, and to digital cameras, and in particular to cameras with folded optics that incorporate such VCMs.

In some exemplary embodiments there is provided an actuator for carrying and actuating a lens holder with a lens, the lens having a first optical axis, the lens receiving light folded from an optical path along a second optical axis that is substantially perpendicular to the first optical axis, the actuator comprising a first VCM engine coupled to the lens holder, a second VCM engine coupled to the lens holder, a first linear ball-guided rail operative to create a first movement of the lens holder upon actuation by the first VCM engine, wherein the first movement is in a first direction parallel to the first optical axis, and a second linear ball-guided rail operative to create a second movement of the lens holder upon actuation by the second VCM engine, wherein the second movement is in a second direction that is substantially perpendicular to the first optical axis and to the second optical axis.

In an exemplary embodiment, the first movement is for focus and the second movement is for OIS.

In an exemplary embodiment, an actuator further comprises a middle moving frame that includes at least one groove in the first direction and at least one groove in the second direction.

In an exemplary embodiment, the lens holder and the lens are made as one part.

In an exemplary embodiment, each of the first and second linear ball-guided rails includes a pair of grooves having at least one ball located therebetween.

In an exemplary embodiment, the first and second VCM engines include respective first and second VCM magnets.

In an exemplary embodiment, an actuator further comprises a static base, wherein the lens holder is movable only along the first direction with respect to the middle moving frame and wherein the middle moving frame is movable only along the second direction with respect to the static base.

In an exemplary embodiment, an actuator further comprises a static base, wherein the lens holder is movable only along the second direction with respect to the middle moving frame and wherein the middle moving frame is movable only along the first direction with respect to the static base.

In an exemplary embodiment, the first and second VCM magnets are fixedly attached to the lens holder.

In an exemplary embodiment, the first VCM magnet is fixedly attached to the lens holder and the second VCM magnet is fixedly attached to the moving frame.

In an exemplary embodiment, the first VCM magnet is fixedly attached to the moving frame, and the second VCM magnet is fixedly attached to the lens holder.

In an exemplary embodiment, the first VCM engine and the second VCM engine include respective first and second VCM coils mechanically coupled to the static base.

In an exemplary embodiment, an actuator further comprises at least one ferromagnetic yoke attached to the static base and used to pull the first VCM magnet in order to prevent both the first and the second linear ball-guided rail from coming apart.

In an exemplary embodiment, an actuator further comprises at least one ferromagnetic yoke attached to the static base and used to pull the first VCM magnet or the second VCM magnet in order to prevent both the first and the second linear ball-guided rail from coming apart.

In an exemplary embodiment, an actuator further comprises at least one ferromagnetic yoke attached to the static base and used to pull the second VCM magnet in order to prevent both the first and the second linear ball-guided rail from coming apart.

In an exemplary embodiment, the first and second VCM coils and the first and second VCM magnets are respectively separated by a constant distance.

In an exemplary embodiment, an actuator further comprises a first position sensor and a second position sensor for measuring a position of the lens upon the movement in the first and second directions, respectively.

In an exemplary embodiment, the first and second position sensors are Hall bar position sensors operative to measure the magnetic field of the first and the second VCM magnets, respectively.

In some exemplary embodiments, any of the actuators above may be included in a folded camera together with an OPFE that folds the light from the optical path along the second optical axis to an optical path along the first optical axis, wherein the OPFE is tiltable around the second direction by a spring based mechanism or a ball based mechanism.

In some exemplary embodiments, the folded camera is included together with an upright camera in a dual-aperture camera.

BRIEF DESCRIPTION OF THE DRAWINGS

Aspects, embodiments and features disclosed herein will become apparent from the following detailed description when considered in conjunction with the accompanying drawings, in which.

DETAILED DESCRIPTION

Figure 1A:
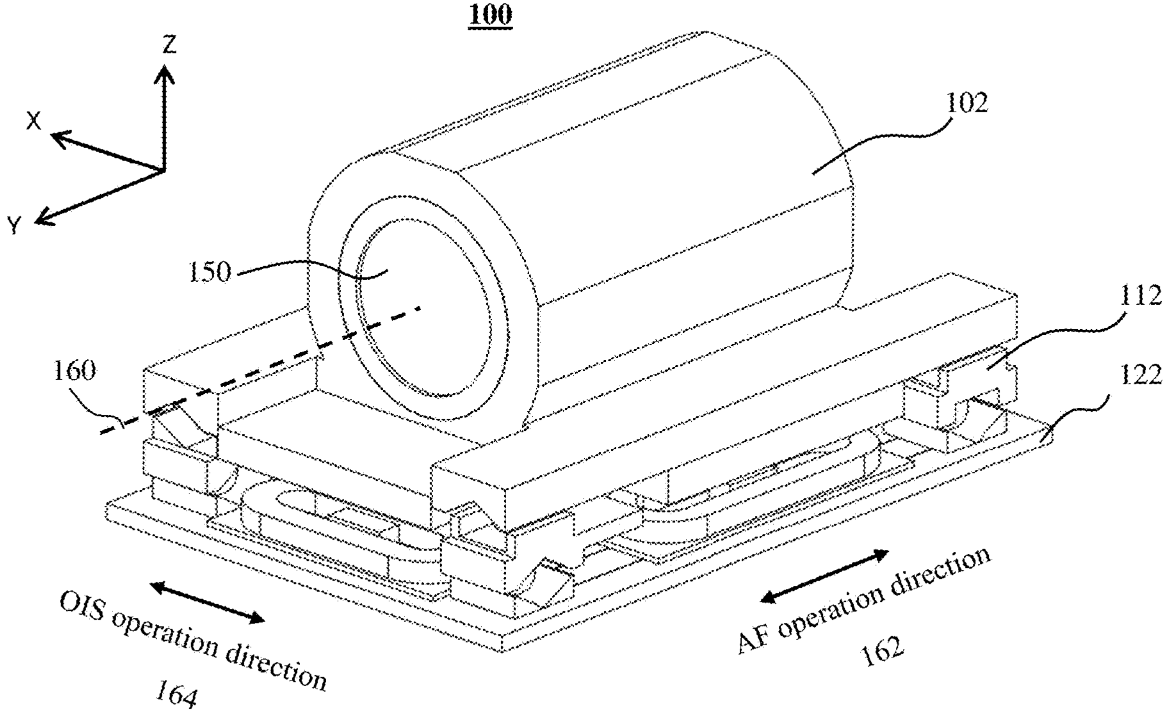
FIG. 1A shows an isomeric view of a linear ball guided VCM actuator according to an exemplary embodiment disclosed herein.
Figure 1B:
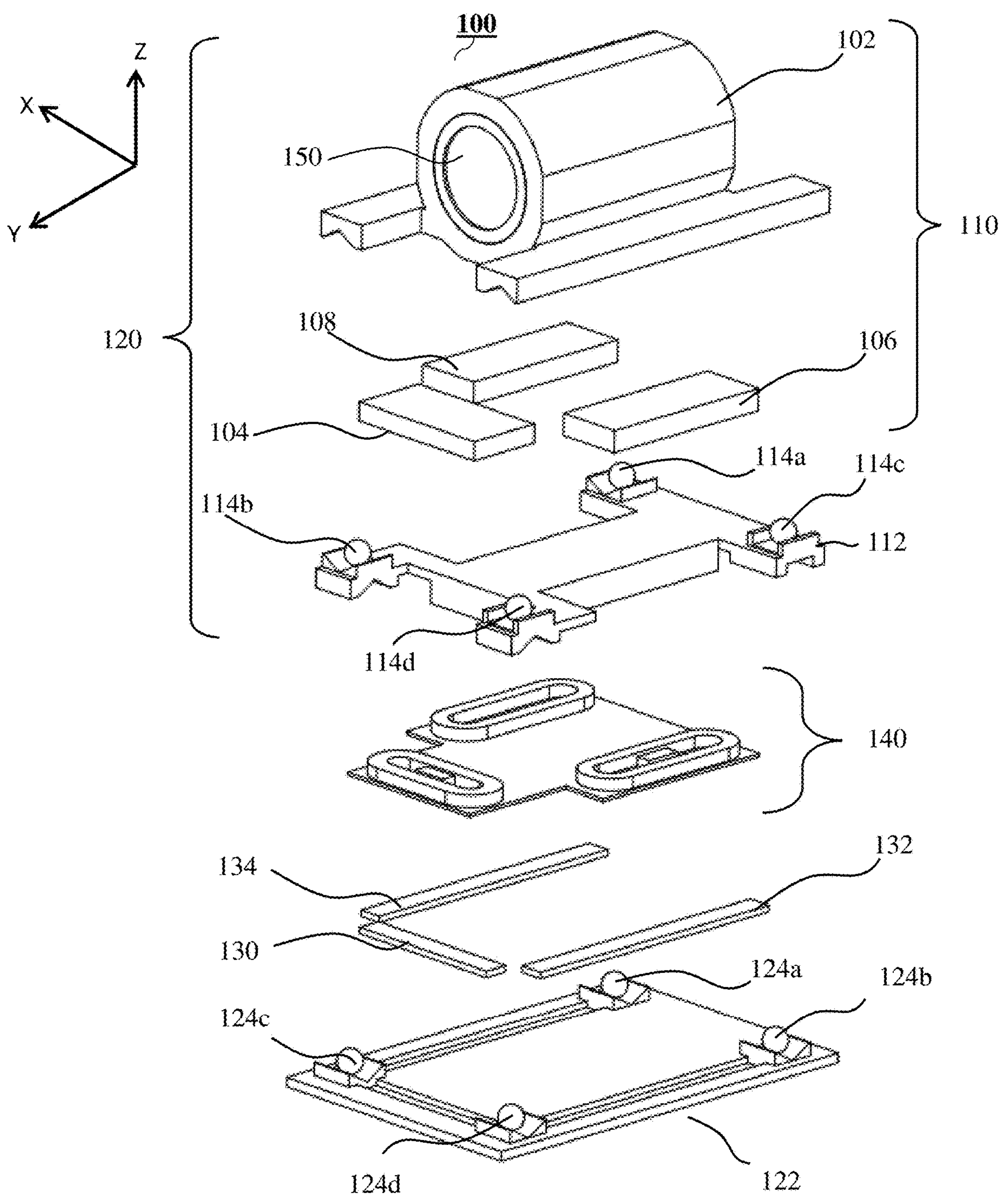
FIG. 1B shows the VCM actuator of FIG. 1A in an exploded view.

FIG. 1A shows an isomeric view of a linear ball guided VCM actuator 100 according to an exemplary embodiment disclosed herein. FIG. 1B shows actuator 100 in an exploded view. Actuator 100 enables the shift of a lens 150 having an optical axis 160 (also referred to as "first optical axis") in two directions in a plane (i.e. the X-Y plane in the shown figures), as described below: AF operation in a direction 162 and OIS operation in a direction 164. Actuator 100 has exemplary length/width/height dimensions in the range of 3-40 mm, i.e. actuator 100 can be contained in a box with dimension of $3\times3\times3$ mm$^3$ to $40\times40\times40$ mm$^3$. The description continues with reference to a coordinate system XYZ shown in FIGS. 1A and 1B as well as in a number of other figures.

Figure 1C:
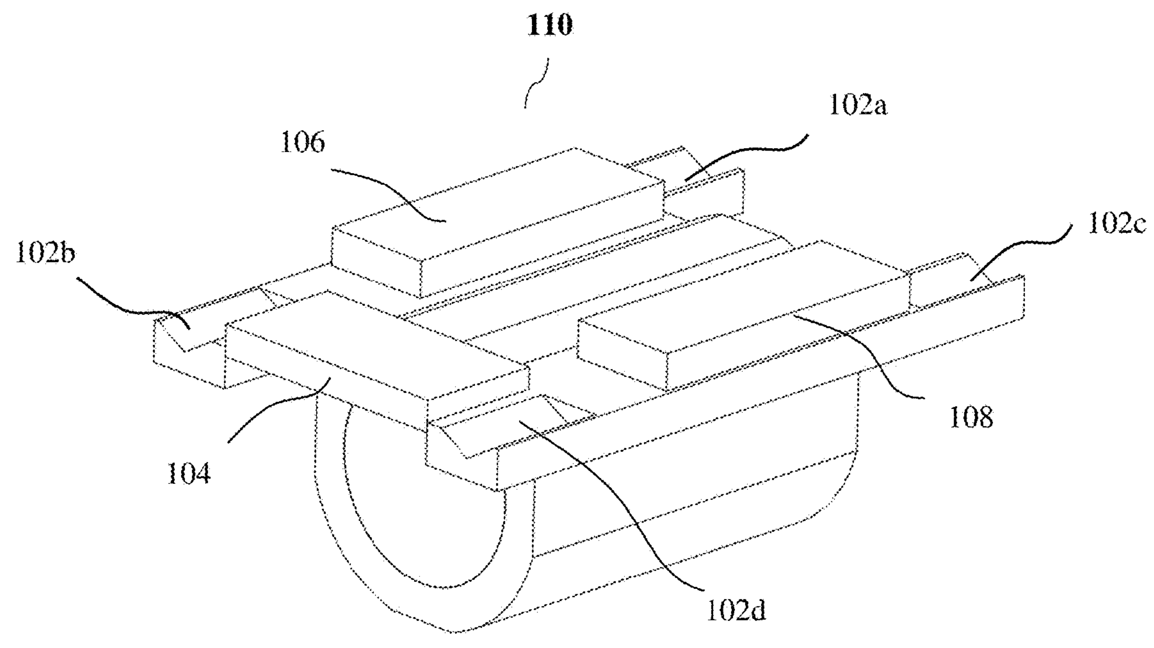
FIG. 1C shows a top actuated sub-assembly of the VCM actuator from a bottom view.

In actuator 100, lens 150 is positioned and held in a lens holder (or lens carrier) 102 that fits the shape of lens 150. In some embodiments, lens holder 102 and lens 150 may be a single part. In some embodiments, they may be separate parts. In the following description and claims, the term "lens holder" may be describing a lens holder only, or a unified part (component) that includes a lens holder and a lens. Lens holder 102 may be made, for example, by plastic molding, or alternatively by other methods. Three magnets 104, 106 and 108 are fixedly attached (e.g. glued) to lens holder 102 from below (in the negative Z direction in the figure). The assembly of lens holder 102 and magnets 104-108 will be referred to henceforth as "top actuated sub-assembly" 110. FIG. 1C shows top actuated sub-assembly 110 from a bottom view. Lens holder 102 includes four grooves, 102*a-d*. Grooves 102*a-d* are parallel to each other and are along the Y-axis. Grooves 102*a-d* are used to guide top actuated sub-assembly 110 along the Y direction.

Figure 1D:
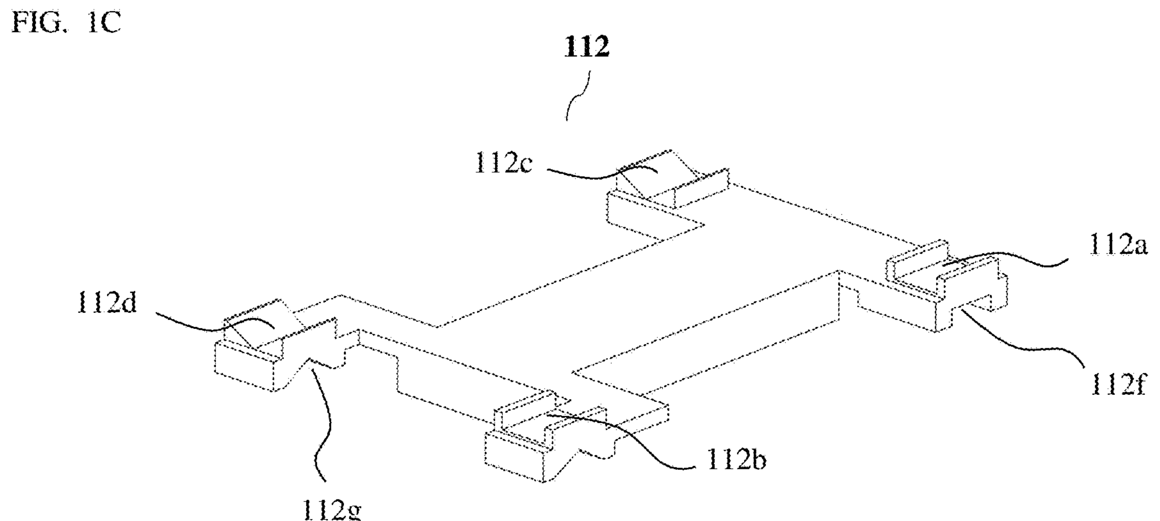
FIG. 1D shows a middle moving frame of the VCM actuator from a top view.
Figure 1E:
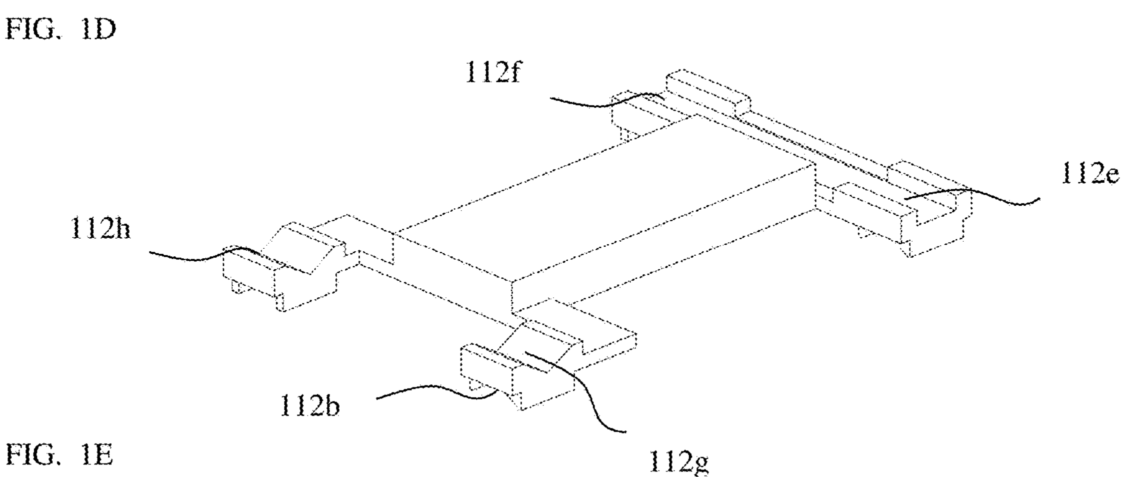
FIG. 1E shows a middle moving frame of the VCM actuator from a bottom view.

Actuator 100 further includes a middle moving frame 112, typically made of plastic. FIGS. 1D and 1E show middle moving frame 112 from top and bottom views, respectively. Middle moving frame 112 includes eight grooves 112*a-h*, four grooves 112*a-d* on a top surface of adaptor 112 along the Y direction and four grooves 112*e-h* on a bottom surface of adaptor 112 are along the X direction. Top actuated sub-assembly 110 is positioned on top of middle moving frame 112 such that grooves 112*a-d* are just below and parallel to grooves 102*a-d*, respectively.

In the embodiment shown, four balls 114*a-d* are positioned on top of grooves 112*a-d* (one ball on top of each groove) such that balls 114*a-d* space apart lens holder 102 and middle moving frame 112 and prevent the two parts from touching each other. In other embodiments, actuator 100 may have more than one ball on top each groove 112*a-d*, for example up to 7 balls per groove. Balls 112*a-d* may be made from Alumina or another ceramic material, from a metal or from a plastic material. Typical ball diameters may be in the range of 0.3-1 mm. Other ball sizes and positioning considerations may be as in co-owned international PCT patent application PCT/IB2017/052383 titled “Rotational Ball Guided Voice Coil Motor”.

Since lens holder 102 and middle moving frame 112 are exemplarily plastic molded, there is some tolerance allowed in part dimensions, typically a few tens of microns or less for each dimension. This tolerance may lead to misalignment of position between adjacent (facing) grooves 102*a*-102*b*-112*a*-112*b* and\or 102*c*-102*d*-112*c*-112*d*. To better align the grooves, grooves 102*a-d*, 112*a-b* may be V-shaped, i.e. have a V cross-section shape to ensure ball positioning, while grooves 112*c-d* may have a wider, rectangular cross-section. Grooves 102*a-b* and 112*a-b* are aligned during assembly, while the alignment of grooves 102*c-d* and 112*c-d* has a small freedom allowed by the rectangular cross section.

The assembly of top actuated sub-assembly 110, balls 114*a-d*, and middle moving frame 112 will be referred to henceforth as “bottom actuated sub-assembly” 120.

Figure 1F:
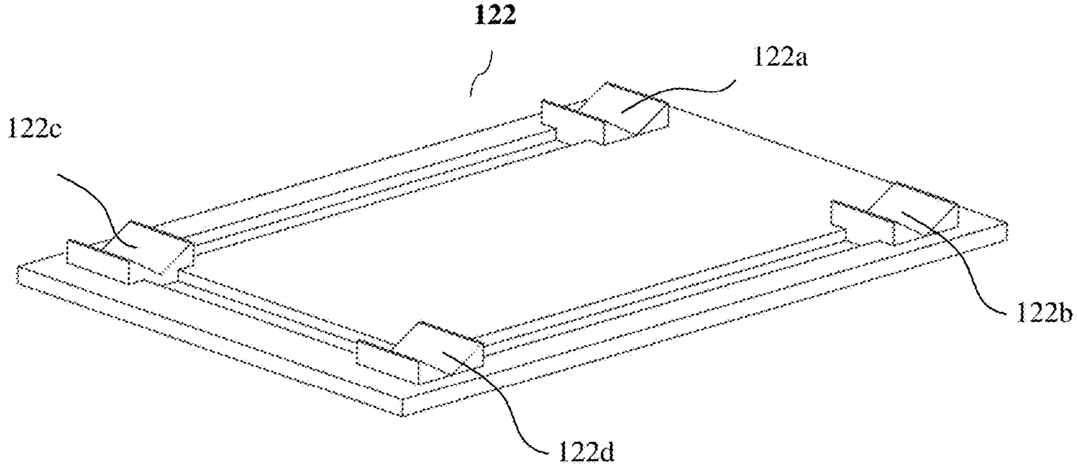
FIG. 1F shows a base of the VCM actuator in isometric view.

Actuator 100 further includes a base 122, typically made of plastic (FIG. 1B and FIG. 1F). Base 122 is molded with four grooves 122*a-d* along the X direction. Bottom actuated sub-assembly 120 is positioned on the top of base 122 such that grooves 122*a-d* are parallel to grooves 112*e-h* respectively. In the embodiment shown, base 122 only serves as part of actuator 100. In other embodiments, the base plastic molding may extend to serve for other purposes, such as a base for an actuator associated with a prism, to hold a camera sensor, to hold a shield, to prevent stray light and dust from reaching image sensor, etc.

Four balls 124*a-d* are positioned on top of grooves 122*a-d* (one ball on top of each groove) such that balls 124*a-d* space middle moving frame 112 apart from base 122 and prevent the two parts from touching each other. In other embodiments, actuator 100 may have more than one ball on top each groove 122*a-d*, for example up to 7 balls per groove. The size, material and other considerations related to balls 124*a-d* are similar to those of balls 114*a-d*.

Actuator 100 further includes three metallic ferromagnetic yokes 130, 132 and 134 fixedly attached (e.g. glued) to base 122 from above (positive Z direction in the figure) such each yoke is positioned below a respective one of magnets 104, 106 and 108. In other embodiments, ferromagnetic yokes 130, 132 and 134 may be fixedly attached to base 122 from below. Each yoke pulls its respective magnet by magnetic force in the negative Z direction, and thus all yokes prevent both top actuated sub-assembly 110 and bottom actuated sub-assembly 120 from detaching from base 122. Balls 114*a-d* prevent top actuated sub-assembly 110 from touching middle moving frame 112 and balls 124*a-d* prevent bottom actuated sub-assembly 120 from touching base 122. Both top actuated sub-assembly 110 and bottom actuated sub-assembly 120 are thus confined along the Z-axis and do not move in positive or negative Z directions. The groove and ball structure further confines top actuated sub-assembly 110 to move only along the Y-axis and bottom actuated sub-assembly 120 to move only along the X-axis.

Figure 1G:
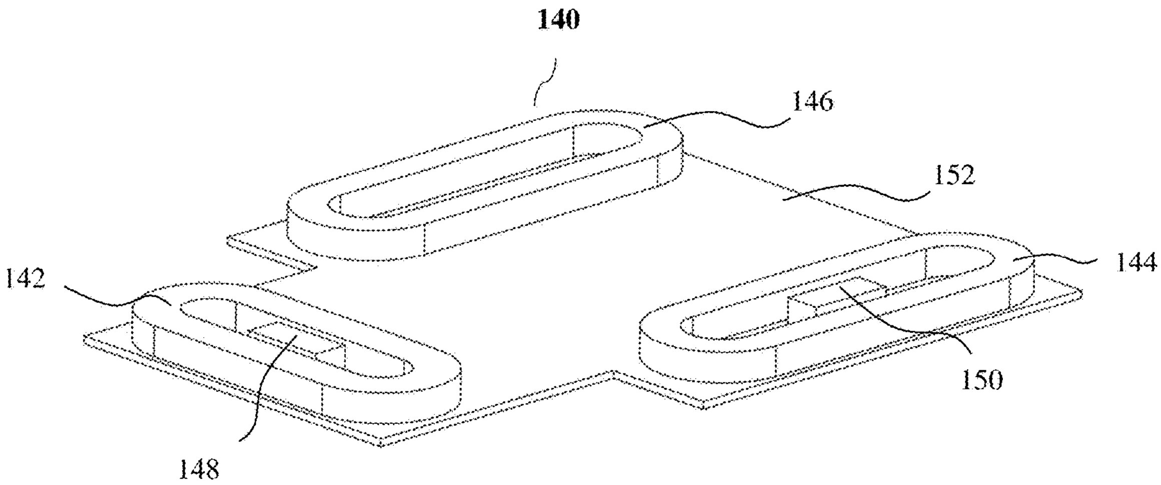
FIG. 1G shows an EM sub-assembly of the VCM actuator in isometric view.

Actuator 100 further includes an electro-magnetic (EM) sub-assembly 140, see FIG. 1B and FIG. 1G. EM sub-assembly 140 includes three coils 142, 144 and 146, two Hall bar elements 148 and 150 and a PCB 152. Coils 142-146 and Hall bar elements 148-150 are soldered (each one separately) to PCB 152. Coils 142-146 have exemplarily each a “stadium” shape and typically include a few tens of coil windings (i.e. in a non-limiting range of 50-250), with a typical resistance of 10-30 ohm. PCB 152 allows sending input and output currents to coils 142-146 and to Hall bar elements 148-126, the currents carrying both power and electronic signals needed for operation. PCB 152 may be connected electronically to the external camera by wires (not shown). EM sub-assembly 140 is positioned between magnets 104-108 and yokes 130-134, such that each coil 142-146 is positioned between a respective one of magnets 104-108 and a respective one of yokes 130-134. Upon driving a current in a coil (e.g. coil 142), a Lorentz force is created on the respective magnet (i.e. magnet 104); a current in a clockwise direction will create force in the positive Y direction, while a current in counter clockwise direction will create a force in the negative Y direction. Similarly, driving a current in coils 144 or 146 will create a respective Lorentz force on magnets 106 or 108; a current in a clockwise direction will create force in the positive X direction, while a current in a counter clockwise direction will create a force in the negative X direction. A full magnetic scheme (e.g. fixed magnets 130-134 pole direction) is described in detail for example in co-owned patent application PCT/IB2016/052179, and is known in the art.

Hall bar element 148 is positioned inside coil 142 and can sense the intensity and direction of magnetic field of magnet 102. Hall bar element 148 can thus measure the respective position of magnet 104 along the Y direction. Hall bar element 150 is positioned inside coil 144 and can sense the intensity and direction of magnetic field of magnet 106 and therefore measure the respective positon of magnet 106 along the X direction. Two Hall bar elements can thus sense the motion of top actuated sub-assembly 110 in the X-Y plane and can serve as position sensors for closed loop control, as known in the art and as described for example in detail in co-owned patent application PCT/IB2016/052179. Actuator 100 can thus serve to move lens 150 in the X-Y plane as needed by optical demands. The control circuit (not shown) may be implemented in an integrated circuit (IC). In some cases, the IC may be combined with Hall elements 148 and\or 150. In other cases, the IC may be a separate chip, which can be located outside of the camera (not shown).

It may be noted that all electrical connections needed by actuator 100 are to EM sub-assembly 140, which is stationary relative to base 122 and to the external world. As such there is no need to transfer any electrical current to any moving part.

Embodiment 100 describes a general two-direction actuator. Other embodiments may have variations as follows:

In embodiment 100, top actuated sub-assembly 110 moves in the Y direction relative to middle moving frame 112 and to base 122, while bottom actuated sub-assembly 120 moves in the X direction relative to base 122. In other actuator embodiments, such as in an actuator 100" shown in FIGS. 1J and 1K below, top actuated sub-assembly 110 may move in the X direction relative to middle moving frame 112 and to base 122, while bottom actuated sub-assembly 120 may move in the Y direction relative to base 122.

In embodiment 100, there are two VCMs providing force in the X direction. This is done to reduce power consumption. In other embodiments, an actuator may have only one VCM providing force in the Y direction.

In embodiment 100, there is one VCM providing force in the Y direction. This is done to reduce space. In other embodiments, an actuator may have more than one VCM in the X direction (for example two VCM).

In embodiment 100, magnets 106 and 108 are fixedly attached to lens carrier 102 as part of top actuated sub-assembly 110. Since magnets 106 and 108 provide force in the X direction and only need to move in the X direction relative to the base, in other embodiments magnets 106 and 108 may be fixedly attached to middle moving frame 112.

In some embodiments, actuator 100 may include parts not shown in figures. These may include: mechanical shield, electrical connectivity to the external world, driving IC, interface to connect to other camera parts, etc.

Figure 1H:
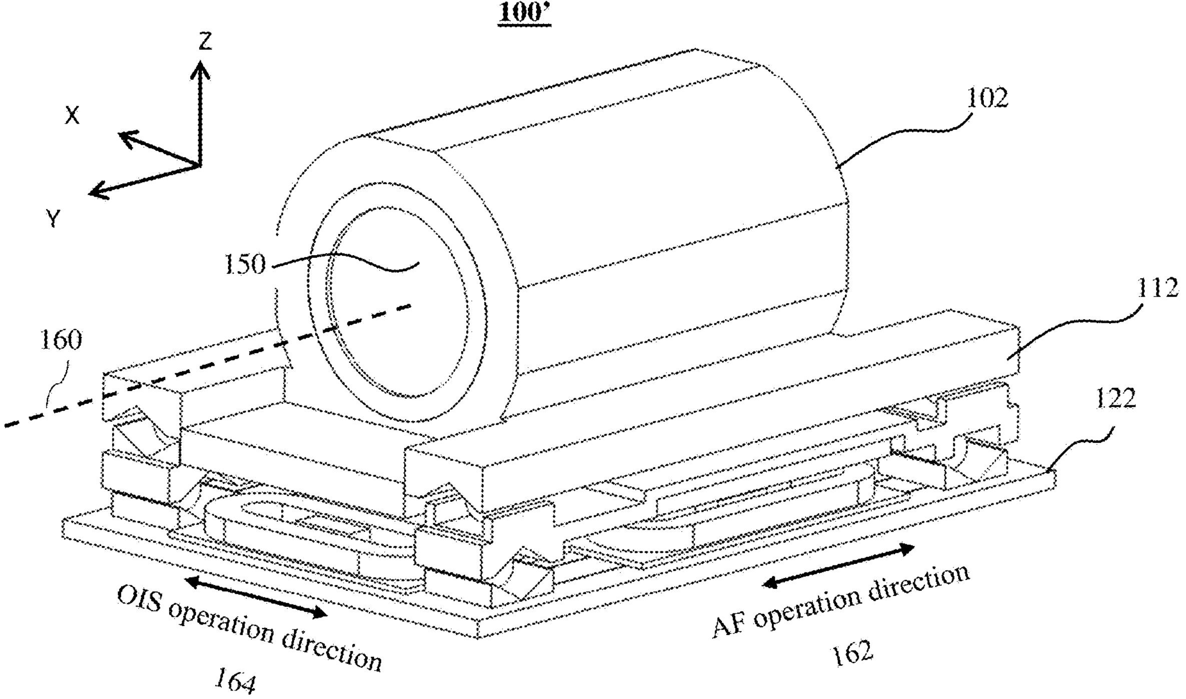
FIG. 1H shows an isomeric view of a linear ball guided VCM actuator according to another exemplary embodiment.
Figure 1I:
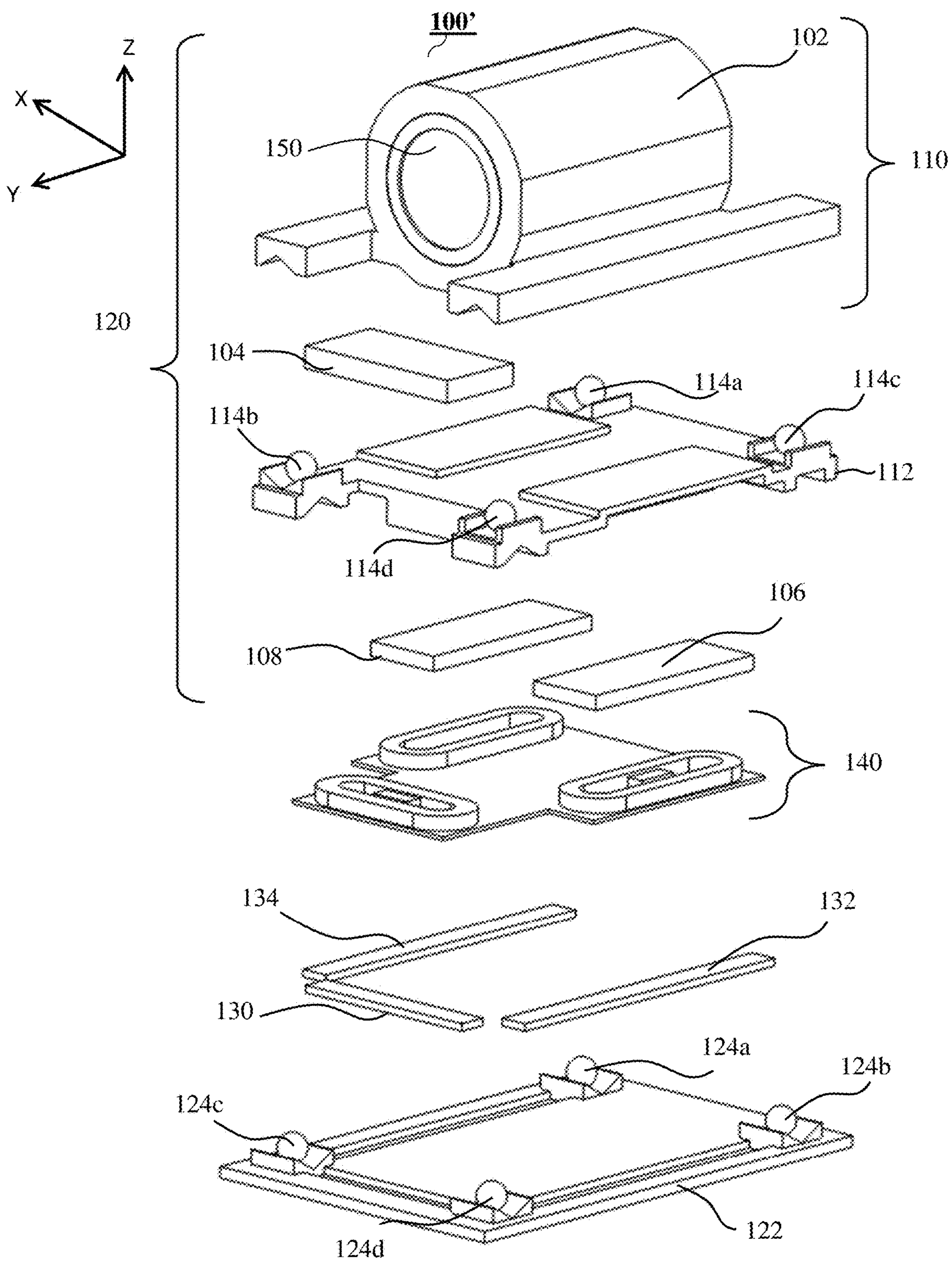
FIG. 1I shows the VCM actuator of FIG. 1H in an exploded view.

FIG. 1H shows an isomeric view of a linear ball guided VCM actuator 100' according to another exemplary embodiment disclosed herein. FIG. 1I shows actuator 100' in an exploded view. Actuator 100' is similar to actuator 100 in structure (and therefore similar elements/components are not numbered and/or described) and function, except for a single difference: in actuator 100, magnets 106 and 108 are attached to lens carrier 102, while in actuator 100', magnets 106 and 108 are attached not to lens carrier 102 but to middle moving frame 112. Attaching magnets 106 and 108 to middle moving frame 112 allows full decoupling of the lens motion along the Y axis from magnets 106 and 108; namely, any motion of lens carrier 102 along the Y axis will not influence position reading by Hall sensor element 150.

Figure 1J:
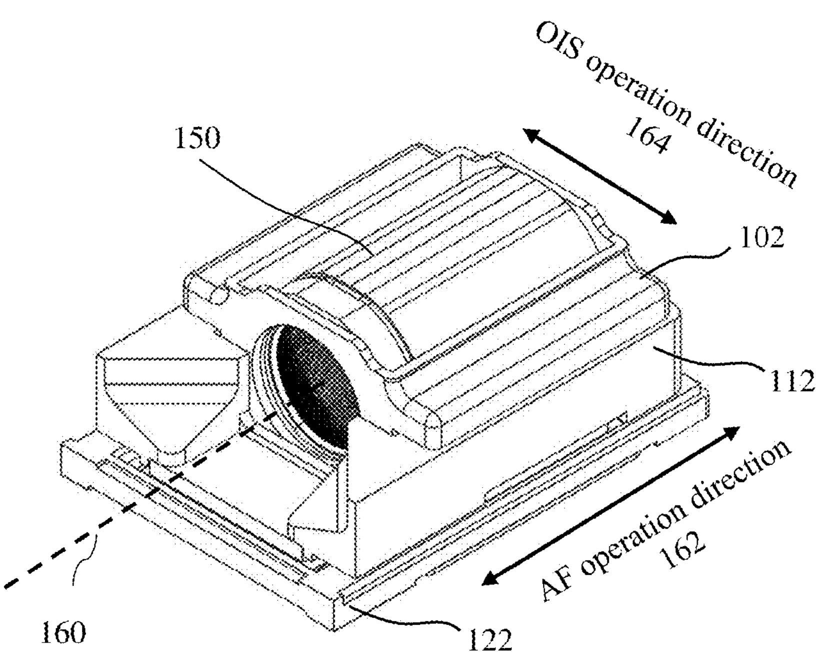
FIG. 1J shows an isomeric view of a linear ball guided VCM actuator according to yet another exemplary embodiment.
Figure 1K:
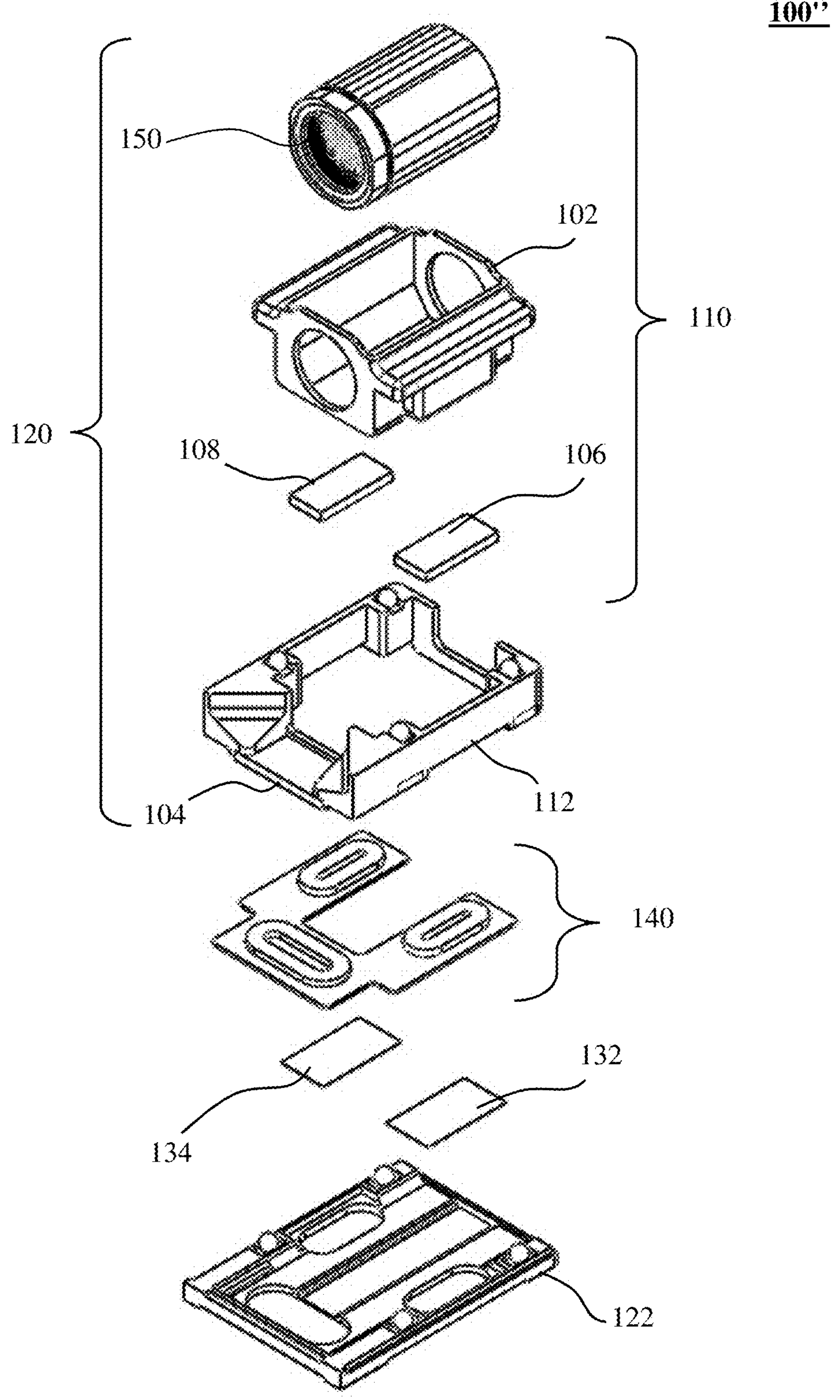
FIG. 1K shows the VCM actuator of FIG. 1J in an exploded view.

FIG. 1J shows an isomeric view of a linear ball guided VCM actuator 100" according to yet another exemplary embodiment disclosed herein. FIG. 1K shows actuator 100" in an exploded view. Actuator 100" is similar to actuator 100 in structure (and therefore similar elements/components are not numbered and/or described) and function, except for the following differences:

a) In embodiment 100, top actuated sub-assembly 110 moves in the Y direction relative to middle moving frame 112 and to base 122, while bottom actuated sub-assembly 120 moves in the X direction relative to base 122. In embodiment 100", top actuated sub-assembly 110 may move in the X direction relative to middle moving frame 112 and to base 122, while bottom actuated sub-assembly 120 may move in the Y direction relative to base 122.

b) In actuator 100 magnet 104 is attached to lens carrier 102. In actuator 100", magnet 104 is attached to middle moving frame 112 and not to lens carrier 102. Attaching magnet 104 to middle moving frame 112 allows full decoupling of the lens motion along the X axis from magnet 104; namely, any motion of lens carrier 102 along the X axis will not influence position reading by Hall sensor element 148.

c) Actuator 100" is designed such that the total height along the Z axis is equal to the diameter of lens 150 plus a thickness t, where t may be about 500 μm. In actuator 100", the lens is inserted from the top. The insertion from the top allows to reduce the height of the actuator.

d) Yoke 130 is missing in actuator 100". Sufficient pull force is created by yokes 132 and 134 as described above. Yokes 132 and 134 pull magnets 106 and 108 respectively, and are holding both top actuated sub-assembly 110 and bottom actuated sub-assembly 120 from detaching from base 122. In other embodiments, a single yoke may be sufficient.

Figure 2A:
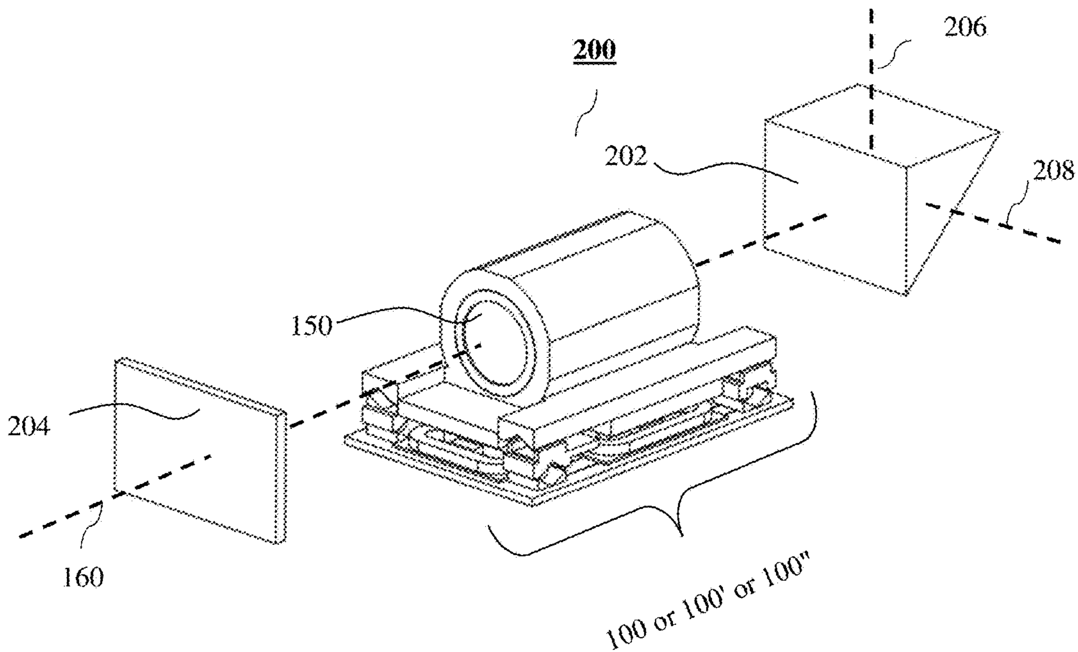
FIG. 2A shows an embodiment of a folded camera that includes an actuator disclosed herein.

FIG. 2A shows an actuator such as actuator 100, 100' or 100" included in a folded camera structure 200. For simplicity, the following description refers to actuator 100, with the understanding that it applies equally well to actuators 100' and 100". In FCS 200, actuator 100 serves exemplarily to move lens 150. Actuation of actuator 100 is done in FCS 200 to create autofocus AF (lens motion along X-axis) and OIS (lens motion along Y-axis) as described in co-owned PCT/IB2016/052179. FCS 200 further includes an OPFE 202 and an image sensor 204. OPFE 202 folds the light from a second optical axis 206 to first optical axis 160.

FCS 200 may further include other parts that are not displayed in FIG. 2A, such as a mechanical shield to protect the camera, stray light limiters, dust traps, IR filter(s), electrical circuitry for connection to external devices, control hardware, memory units (e.g. EEPROM), gyroscopes, etc. FCS 200 may further include an actuation mechanism for moving or tilting OPFE 202 for OIS around an axis 208, axis 208 being substantially perpendicular to both optical axis 160 and optical axis 206. Note that in FCS 200, magnet 104 and coil 142 are positioned between lens 150 and image sensor 204, a region known in the art as the "back focal length" (BFL) of lens 150.

Figure 2B:
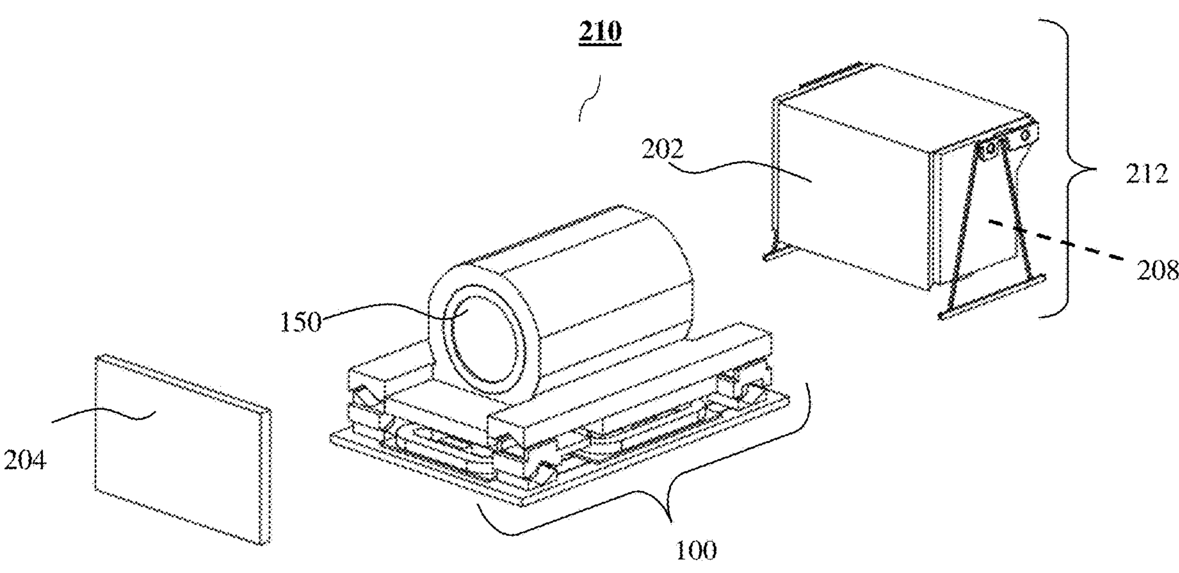
FIG. 2B shows an embodiment of a folded camera that includes an actuator disclosed herein and an OPFE rotated by one embodiment of a rotational spring based mechanism.

FIG. 2B shows an embodiment numbered 210 of another FCS that includes an actuator such as actuator 100, 100' or 100". In FCS 210, OPFE 202 is tiltable by a first embodiment of a rotational spring based mechanism numbered 212. Exemplarily, the mechanism may be based on a VCM. A full description of a rotational spring based VCM, with explanation of its method of operation, is provided in co-owned patent PCT/IB2016/052179. In FCS 210, actuator 100 and VCM 212 are physically separate; in other embodiments, they may be connected or share parts, for example, by having a single unified plastic base.

Figure 2C:
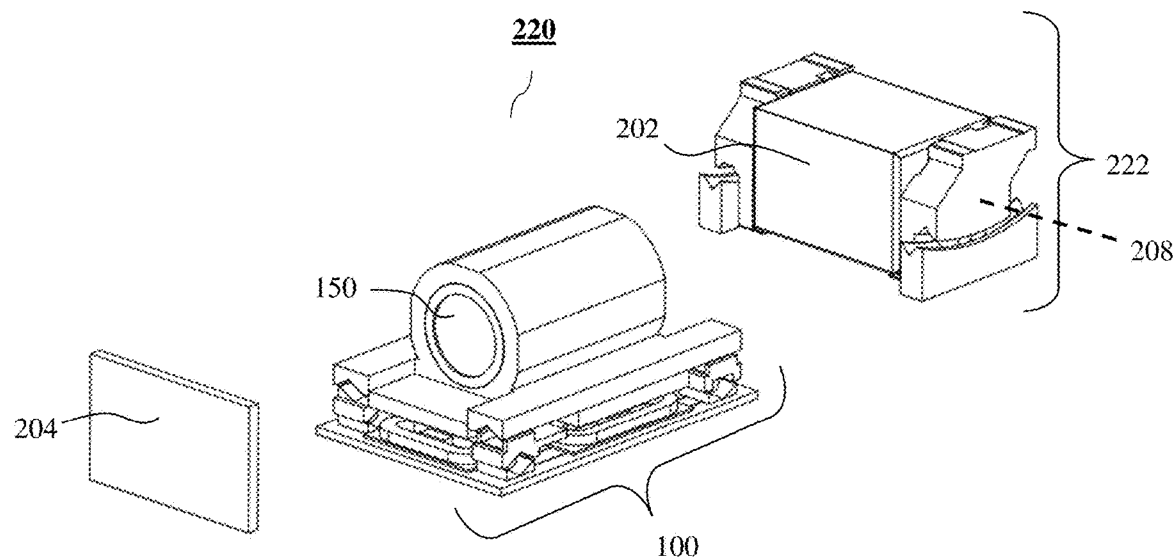
FIG. 2C shows an embodiment of a folded camera that includes an actuator disclosed herein and an OPFE rotated by another embodiment of a rotational ball based mechanism.

FIG. 2C shows an embodiment numbered 220 of yet another FCS that includes an actuator such as actuators 100 or 100' or 100". In FCS 220, OPFE 202 is tiltable (rotatable) by a second embodiment of a rotational ball based mechanism numbered 222. Exemplarily, the mechanism may be based on a VCM. A full description of a rotational ball guided VCM 222, with explanation of the method of operation, is provided in PCT IB2017/052383. In FCS 220, actuator 100 and VCM 222 are physically separate; in other embodiments, they may be connected or share parts, for example, by having a single unified plastic base.

Figure 3:
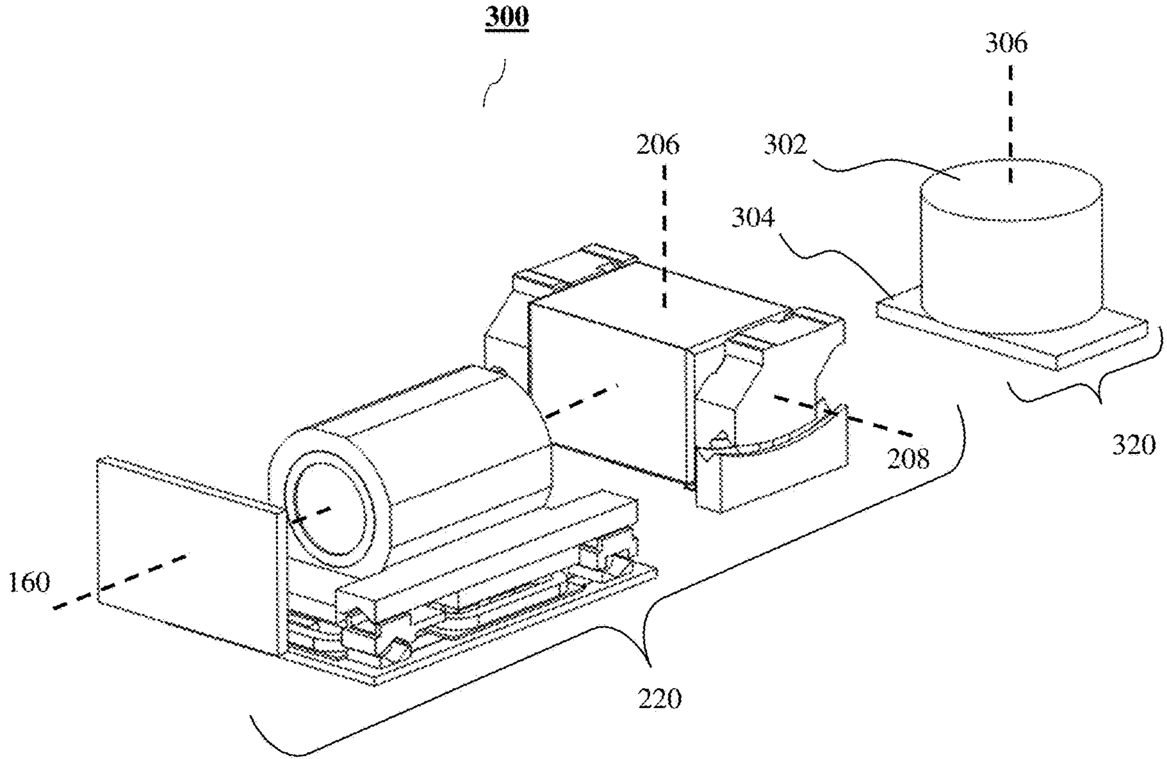
FIG. 3 shows an embodiment of a dual-camera that includes a folded camera as in FIG. 2C together with a non-folded (up right) camera.

FIG. 3 shows an exemplary embodiment numbered 300 of a dual-aperture camera (dual-camera) that comprises a FCS such as FCS 200, 210 or 220 and a non-folded (upright) camera 320. In the exemplary embodiment shown, the FCS is similar to FCS 220, but it should be understood that the FCS can be any other FCS disclosed herein. Upright camera 320 includes a lens 302 and an image sensor 304. Lens 302 has an optical axis 306 that is substantially parallel to second optical axis 206. Upright camera 320 may include other parts (not shown), such as an actuation mechanism for lens 302, a shield, electrical circuitry, etc. The usage and operation of a dual-camera structure is described for example in co-owned U.S. Pat. No. 9,392,188.

Any of the actuators disclosed above may be included in a folded camera, which folded camera may be included together with an upright (non-folded) camera in a dual-aperture camera with folded lens, for example as described in co-owned U.S. Pat. No. 9,392,188.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. An actuator system, comprising:

a first actuator for carrying and actuating a lens holder, the lens holder configured to receive a lens assembly comprising a plurality of lens elements assembled along a lens optical axis; and a second actuator for carrying and actuating a prism holder, the prism holder configured to receive a prism operational to fold light from a first optical path to a second optical path, wherein the second optical path is parallel to the lens optical axis, wherein the first actuator comprises a first magnet and a first coil and is operational to linearly actuate the lens holder along a first direction parallel to the lens optical axis, wherein the second actuator comprises a second magnet and a second coil and is operational to rotationally actuate the prism holder along a holder prism rotation axis, and wherein the first actuator is a linear ball guided actuator and the second actuator is a rotational ball guided actuator.

2. The actuator of claim 1, wherein the first actuator and the second actuator are physically separate.

3. The actuator of claim 1, wherein the prism holder rotation axis is perpendicular to the first optical path.

4. The actuator of claim 1, wherein the prism holder rotation axis is perpendicular to the first direction.

5. The actuator of claim 1, wherein the first optical path is perpendicular to the second optical path.

6. The actuator of claim 1, wherein the plurality of lens elements define a common lens diameter DL, wherein the first actuator has a height HA measured along a direction parallel to the first optical path, and wherein HA≤DL+0.5 mm.

7. The actuator of claim 1, wherein the first actuator includes at least four grooves.

8. The actuator of claim 7, wherein the first actuator includes four balls.

9. The actuator of claim 1, wherein balls used in the first actuator and in the second actuator have ball diameters in the range of 0.3-1 mm.

10. The actuator of claim 1, wherein each of the first actuator and the second actuator have length and/or width and/or height dimensions in the range of 3-40 mm.

11. The actuator of claim 1, wherein each of the first actuator and the second actuator can be contained in a box with dimension of $3\times3\times3$ $mm^3$ to $40\times40\times40$ $mm^3$.

12. The actuator of claim 1, wherein the first actuator comprises a position sensor.

13. The actuator of claim 1, wherein the second actuator comprises a position sensor.

14. The actuator of claim 12, wherein the first actuator comprises a yoke.

15. The actuator of claim 13, wherein the second actuator comprises a yoke.

16. The actuator of claim 1, wherein the actuator is included in a folded camera, wherein the folded camera further comprises a prism, a lens assembly, an image sensor and IR filter.

17. The actuator of claim 16, wherein the linear actuation of the lens holder is for focusing the folded camera.

18. The actuator of claim 16, wherein the rotational actuation of the prism holder is for performing optical image stabilization.

19. The actuator of claim 16, wherein the folded camera is included in a mobile device.

20. The actuator of claim 19, wherein the mobile device is a smartphone.

* * * * *